Feb. 8, 1949.    C. W. BROOKS    2,461,258
AUTOMATIC TRANSMISSION MECHANISM
Filed June 6, 1946    2 Sheets-Sheet 1

Inventor
Cuyler W. Brooks
Attorneys

Feb. 8, 1949.   C. W. BROOKS   2,461,258
AUTOMATIC TRANSMISSION MECHANISM
Filed June 6, 1946    2 Sheets-Sheet 2

Inventor
Cuyler W. Brooks
By Francis P. Vanderwerken and
Joseph N. Crowe
Attorneys Patented Feb. 8, 1949

2,461,258

UNITED STATES PATENT OFFICE 2,461,258

AUTOMATIC TRANSMISSION MECHANISM

Cuyler W. Brooks, Brooklyn, N. Y.

Application June 6, 1946, Serial No. 674,718

5 Claims. (Cl. 322—28)

1

The invention described herein may be manufactured and used by or for the Government for governmental purposes, without payment to me of any royalty thereon.

This invention relates to power transmissions; more particularly it is directed to an improvement in the automatic transmission mechanism disclosed in Patent No. 2,269,434, issued January 13, 1942.

One of the objects of the invention is to provide a transmission mechanism by which the ratios between the speed of a driving and a driven member are automatically adjusted to furnish a constant speed output of power regardless of load variations.

Another object of the invention is to provide a variable speed transmission which permits a gradual change in the ratio of the speeds of the driving and driven members and without shock to the apparatus.

Still another object of the invention is to provide a variable speed transmission mechanism which is efficient in use, simple in operation and one which is entirely automatic and capable of effecting a wide variation in ratios between the speeds of the driving and driven members.

With the above and other objects and advantages in view, the invention consists of certain features of construction and operation of parts which will hereinafter be described and shown in the accompanying drawings, in which.

Figure 1:
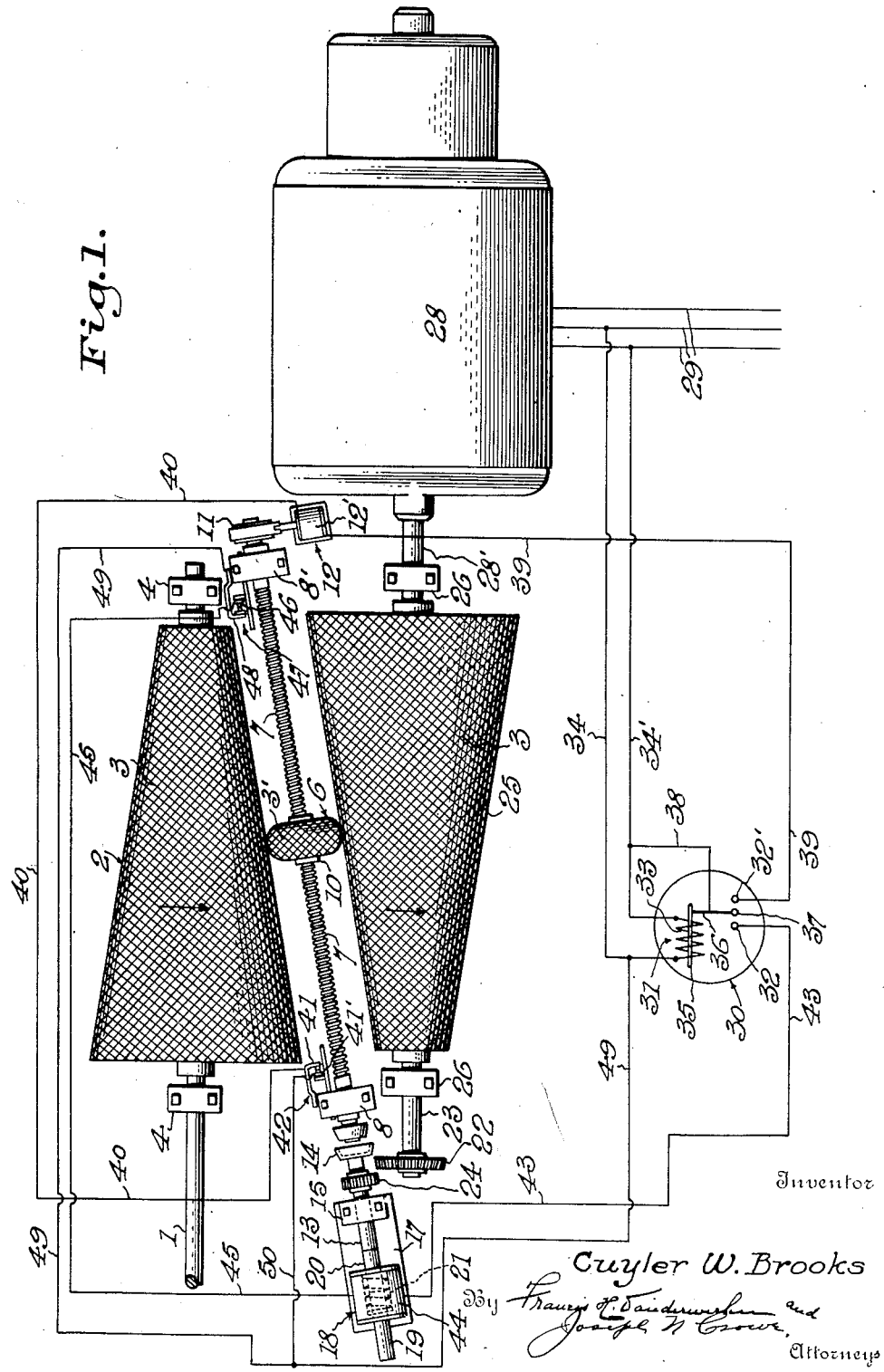
Figure 1 is a top plan view of the transmission mechanism including two cones having a friction disc at the mid-point thereof, with a diagrammatic outline of an electrical control apparatus connected to the transmission mechanism.
Figure 2:
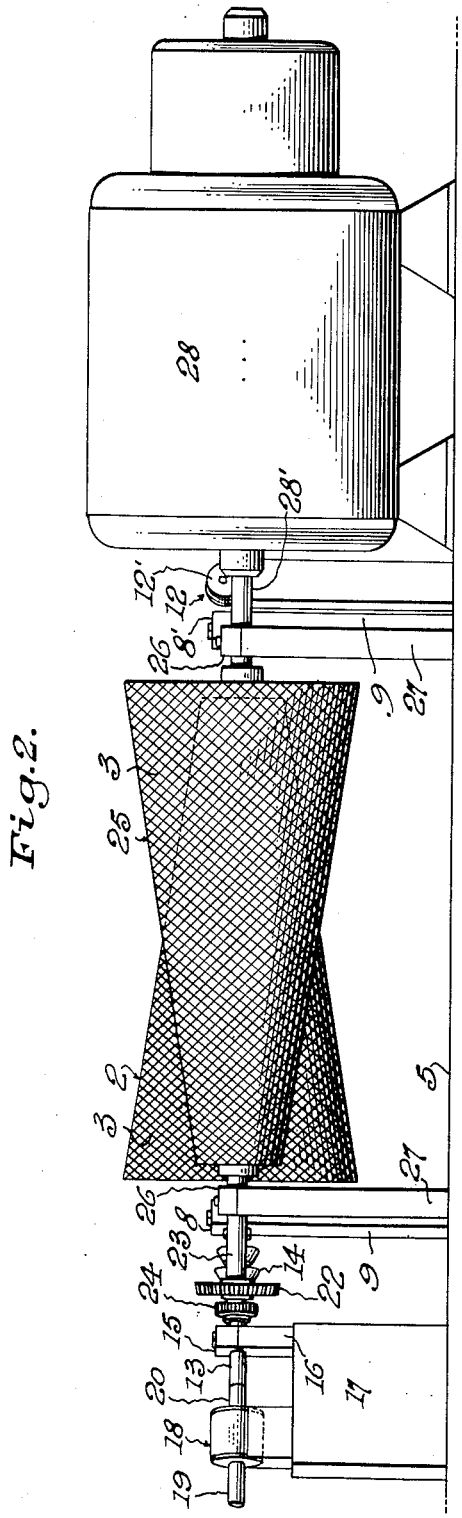
Figure 2 is a side elevation of the transmission mechanism.
Figure 3:
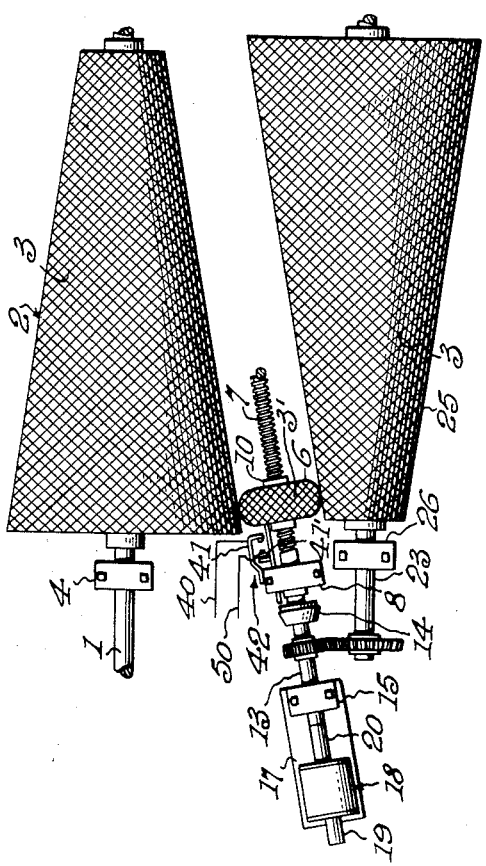
Figure 3 is a fragmentary top plan view thereof with the friction disc having been actuated along a screw shaft to the left end of the cones to actuate a switch of the electrical control apparatus.

In carrying out the invention, a drive shaft 1 is provided which is adapted to be connected at one end to a prime mover (not shown) which may be the fly wheel, transmission or drive shaft of a car, or power take-off unit from the above-mentioned drives or the like. The shaft 1 carries a conical roller or drum 2 which is covered with ribbed or checkered rubber 3 or any other suitable material of a high co-efficient of friction and the shaft 1 is mounted in bearings 4 provided on the upper ends of standards mounted on a base 5. The cone 2 drives a friction disc or idler 6 which is mounted on a screw shaft 7 di-

2 agonally disposed with reference to the shaft 1 and rotatably mounted in bearings 8 and 8' provided on the upper ends of standards 9.

The friction disc 6 may be either solid or pneumatic and covered with the same material 3' as cone 2. The inner hub 10 of the friction disc is worm threaded to move along the shaft 7 when there is any difference in their velocity of rotation. On the right end of shaft 7 is a brake hub 11 of a solenoid thruster brake 12 and on the left end of shaft 7 is a jack shaft 13 connected to the shaft 7 through a clutch 14 operating between bearings 8 and 15 on the upper ends of standards 9 and 16 mounted on base 5 and on supporting structure 17 respectively.

Clutch 14 is actuated by a solenoid 18 through plunger 19 and non-magnetic plunger 20, with the plunger 19 of the solenoid 18 adapted to be pressed inwardly against the action of a spring 21 connected to the outer end of the plunger 20. The solenoid 18 is mounted on the supporting structure 17 and connected in an electrical circuit to be hereinafter described. The jack shaft 13 is driven by a beveled gear 22 mounted on the left end of a driven shaft 23 through a smaller gear 24 on the jack shaft. The driven shaft 23 has a conical roller or drum 25 mounted thereon which is reverse from the cone 2 and rotatably mounted in bearings 26, provided on the upper ends of standards 27, respectively. The cone 25 is covered with ribbed or checkered rubber 3, the same as cone 2, and is driven by the friction disc 6. The driven shaft 23 on which the cone 25 is mounted is an extension of the armature shaft 28' of a generator 28 illustrated as being of the three phase A. C. type, as it is shown connected to a three phase electrical A. C. circuit by conductors 29 adapted to be connected to any suitable source of electrical supply (not shown). A single phase A. C. or D. C. generator would be equally adaptable.

A voltmeter switch 30 including a solenoid 31 and spaced contacts 32 and 32' is connected in the three phase electrical A. C. circuit, with the coil 33 of the solenoid 31 being connected by electrical conductors 34 and 34' to two of the conductors 29 connecting the generator 28 to the source of electrical supply. The plunger 35 for the solenoid 31 of the voltmeter switch 30 is provided with a downwardly extending arm 36 having an electrical contact 37 at its free end adapted to engage either of the contacts 32 or 32'. The arm 36 of the plunger 35 is connected to conductor 34' by an electrical conductor 38. The electrical contact 32' of the voltmeter switch 30 is connected by a conductor 39 to the coil 12' of the solenoid thruster brake 12, which in turn is connected by a conductor 40 to an electrical contact 41 of a limit switch 42 on the bearing 8 on the left-hand side of the screw shaft 7. The other contact 32 of the voltmeter switch 30 is connected by a conductor 43 to the coil 44 of the solenoid 18 which in turn is connected by a conductor 45 to an electrical contact 46 of a limit switch 47 on the bearing 8' on the right end of the shaft 7, with the other contact 48 of the limit switch 47 being connected by a conductor 49 to the conductor 34 connected to the coil 33 of the solenoid 31 of the voltmeter switch 30. The other contact 41' of the limit switch 42 is connected by conductor 50 to the conductor 49.

In a complete cycle of operation of the improved automatic transmission mechanism, assuming that the generator 28 is of the 5 k. w., 220 volts, 3 phase, 1800 R. P. M. type and the ratio of the diameters of the ends of the cones 2 and 25 is 3 to 1, also that the diameter of the friction disc 6 is equal to the diameter of the small ends of cones 2 and 25 and also that the ratio between the gear 22 on driven shaft 23 and gear 24 on jack shaft 13 is 3.1 to 1, with the shaft 1 turning at 1800 R. P. M. in the indicated direction (Fig. 1), friction disc 6 will be located on the shaft 7 in a position where the diameter of cone 2 at the point of contact is equal to the diameter of cone 25 at the point of contact, in other words, at the mid-point of the cones. Under these conditions the ratio of the diameter of the cones to the diameter of the friction disc 6 will be 2 to 1; hence friction disc 6 will be rotating at 3600 R. P. M., and cone 25 at 1800 R. P. M. which will provide a generator output of 220 volts.

Assuming that the speed of shaft 1 is reduced to 600 R. P. M. at this speed, the voltage of generator 28 is 215 volts at which point the coil 33 of voltmeter switch 30, which is energized through conductors 34 and 34' connected to conductors 29 is weakened until the contact 37 on the arm 36 on the plunger 35 of the solenoid 31 comes into engagement with the contact 32, whereby the coil 12' of the solenoid thruster brake 12 is energized through the conductor 39, coil 12' of the thruster brake 12, conductor 40, contacts 41, 41' of limit switch 42, conductors 50 and 49, which causes the thruster brake to be actuated for slowing the rotation of or stopping of the screw shaft 7. The direction of rotation of disc 6 causes it to travel along screw shaft 7 toward the left-hand end until it opens limit switch 42, which opens the above-described circuit, de-energizing thruster brake 12. At this point friction disc 6 and shaft 7 will be rotating 1800 R. P. M. as will cone 25 and generator 28, with a generated voltage of 220 volts. During the above cycle of operation, contacts 37 and 32' are opened by voltmeter switch 30 as soon as the operation has restored the voltage to above 215 volts. Assuming that the speed of shaft 1 is increased to 5400 R. P. M. after this increase starts, the voltage of generator 28 is increased until it reaches 225 volts at which point the coil 33 of the solenoid 31 of voltmeter switch is energized, operating the plunger 35 and pulling the contact 37 on arm 36 into contact with the contact 32, whereby the solenoid 18 is energized through the conductors 34', 38, arm 36 of the solenoid 31 of the voltmeter switch 30, conductor 43, the coil 44 of the solenoid 18, conductor 45, through the contacts 46 and 47 of the limit switch 48, conductor 49 to the conductor 34. This pushes jack shaft 13 to the right, sliding gear 24 in mesh with the gear 22 on shaft 23 and engaging clutch 14 for driving the screw shaft 7 in a direction which causes the friction disc 6 to travel to the right.

At the beginning of this cycle of operation, cone 2 was rotating 600 R. P. M.; friction disc 6, cone 25 and gear 22 were rotating 1800 R. P. M.; gear 24 and shafts 7 and 13 were therefore rotating 5580 R. P. M. This difference in velocity of disc 6 and shaft 7 causes disc 6 to travel along shaft 7 to the right. As the acceleration continues, disc 6 continues to be driven to the right, until just before operating limit switch 48 opens contacts 46 and 47 and de-energizes the coil 44 of solenoid 18. During this period the following condition exists: with shaft 1, cone 2 and friction disc 15 rotating at 5400 R. P. M.; cone 25, gear 22 and generator 28 were still rotating at 1800 R. P. M. and gear 10 and screw shaft 7 were rotating at 5580 R. P. M. This difference of 180 R. P. M. between disc 6 and screw shaft 7 would be sufficient to cause disc 6 to travel to the extreme right end at which point, limit switch 48 would be actuated to open the circuit and de-energize the solenoid 18 whereby the spring 21 returns the jack shaft 20 to its original position and withdraws the gear 24 from mesh with the gear 22 and disconnecting clutch 14.

Only for a constant and predetermined rate of acceleration and deceleration of the prime mover, as will be obvious, would the operational cycle be continuous. However, with this mechanism, the percent variation and constancy of speed of the driven cone 25 is dependent only on the calibration of the voltmeter switch 30 and the pitch of the screw of shaft 7, which two features would be subject to adjustment depending on the range of speed and rate of acceleration and deceleration of the primer mover.

It will readily be seen that there has herein been provided a novel and efficient form of a variable transmission mechanism which is well adapted for the purpose intended. Even though there has been herein shown the transmission as comprising certain features of construction and operation of parts, it is nevertheless to be understood that various changes may be made therein; if the changes do not depart from the spirit and scope of the claims.

Having thus described my invention, what I claim as new and wish to secure by Letters Patent is:

1. An automatic transmission mechanism including a driving shaft connected to a load, a driven shaft, a screw shaft, cones carried by said driving and driven shafts, said cones tapering in opposite directions from each other, a friction disc threadedly mounted on said screw shaft and forming a driving connection between said cones, said screw shaft causing said disc to advance along the surfaces of the cones in either direction and to thereby change the velocity ratio between the cones, a generator driven by said driven shaft, electrical circuit means including switches controlled by the voltage of the generator, said switches being adapted to be actuated by said disc, for controlling the generator output between predetermined limits, and means for braking the rotation of the screw shaft responsively to the generator output varying beyond a predetermined voltage to cause a return of the disc along the shaft.

2. An automatic transmission mechanism including a driving shaft connected to a load, a driven shaft extending parallel to and at a distance from said driving shaft, a screw shaft extending diagonally of said driving and driven shafts, cones carried by said driving and driven shafts, said cones tapering in opposite directions from each other; a friction disc threadedly mounted on said screw shaft and forming a driving connection between said cones, said screw shaft causing said disc to advance along the surfaces of the cones in either direction and to thereby change the velocity ratio between the cones, a generator driven by said driven shaft, speed retarding means mounted on said screw shaft, electrical circuit means including switches connected to be controlled by the voltage of the generator output, said speed retarding means including electrically responsive braking means for the screw shaft connected in circuit with said electrical circuit means and adapted to be actuated for retarding the rotation of said screw shaft responsively to a predetermined change in voltage of said generator output, said disc being adapted to actuate said switches whereby upon the rotation of said screw shaft being retarded, said disc is caused to be advanced on the screw shaft in one direction for actuating one of said switches for opening said electrical circuit means, and means for engaging and disengaging said screw shaft with said driven shaft for rotating said screw shaft in a direction to advance said disc on the screw shaft in a direction to actuate another of said switches to close the electrical circuit means responsively to predetermined opposite variations in voltage of the generator output beyond a predetermined value for controlling the generator output between predetermined limits.

3. An automatic transmission mechanism including a driving shaft connected to a load, a driven shaft extending parallel to and at a distance from said driving shaft, a screw shaft extending diagonally of said driving and driven shafts, cones carried by said driving and driven shafts, said cones tapering in opposite directions from each other and a friction disc threadedly mounted on said screw shaft and forming a driving connection between said cones, said screw shaft causing said disc to advance along the surfaces of the cones in either direction and to thereby change the velocity ratio between the cones, a generator driven by said driven shaft, means to effect the engagement of said screw shaft with said driven shaft, electrical circuit means connected to be controlled by the voltage of said generator, said electrical circuit means including a solenoid thruster brake mounted on the screw shaft for retarding rotation of the shaft responsively to the voltage of the generator reaching a predetermined value, switches mounted on said screw shaft and a solenoid, said disc being adapted to actuate said switches, said solenoid thruster brake connected to be actuated responsively to a predetermined decrease in the load and generator output for retarding the rotation of said screw shaft, whereby said disc is caused to move on said screw shaft in a certain direction to actuate one of said switches for opening said electrical circuit means, and said solenoid connected to be actuated for actuating said first-mentioned means for effecting the engagement of said screw shaft with said driven shaft upon an increase in the load and generator output, whereby said friction disc is caused to travel on the screw shaft in an opposite direction and to actuate another of said switches for opening said electrical circuit means and de-energizing said solenoid, and means for disengaging the screw shaft from said driven snaft upon the solenoid being de-energized.

4. An automatic transmission mechanism for controlling the relative velocity of a driving shaft with respect to a driven shaft comprising a cone mounted on said driving shaft, a screw shaft, a friction disc threadedly mounted on said screw shaft, a cone mounted on said driven shaft, said cones tapering in opposite directions from each other, a generator driven by said driven shaft, said disc forming a driving connection between said cones, said screw shaft being adapted to advance the disc along the surfaces of the cones in either direction to thereby change the velocity ratio between the cones, circuits electrically connected to said generator, switches, a voltmeter switch electrically connected to and actuated by said generator, said voltmeter switch being electrically connected to said first-mentioned switches, a solenoid thruster brake mounted on the screw shaft for braking rotation of the screw shaft responsively to predetermined variations in voltages of output from the generator and a solenoid connected in circuit with said voltmeter switch, said solenoid thruster brake being adapted to be actuated by said voltmeter switch for retarding the rotation of said screw shaft responsively to predetermined variations in voltage output of said generator, said first-mentioned switches being adapted to be actuated by said disc for controlling said circuits, means in circuit with the said solenoid and adapted to be actuated thereby for engaging said screw shaft with said driven shaft whereby to control the generator output between predetermined limits, and means for disengaging said screw shaft from said driven shaft responsively to deenergization of the solenoid.

5. An automatic transmission mechanism for controlling the relative velocity of a driving shaft with respect to a driven shaft comprising a cone mounted on the driving shaft, a screw shaft, a friction disc threadedly mounted on said screw shaft, a cone mounted on said driven shaft, said cones tapering in opposite directions from each other, a generator driven by said driven shaft, said disc forming a driving connection between said cones, said screw shaft being adapted to advance the disc along the surfaces of the cones in either direction to thereby change the velocity ratio between the cones, a jack shaft, a clutch adapted to connect the jack shaft with said screw shaft, circuits electrically connected to said generator, switches, a voltmeter switch connected to said generator and actuated by the voltage thereof, gears mounted on said jack shaft and said driven shaft, said voltmeter switch being electrically connected to said first-mentioned switches, a solenoid thruster brake mounted on the screw shaft for braking rotation of the screw shaft and a solenoid connected in circuit with said voltmeter switch, said solenoid thruster brake being adapted to be actuated by said voltmeter switch for retarding the rotation of said screw shaft responsively to predetermined variations in voltages in the generator output, said first-mentioned switches being adapted to be actuated by said disc for controlling said circuits, said jack shaft being adapted to be actuated by said solenoid for effecting the engagement of said clutch with said screw shaft and meshing said gears with each other responsively to a predetermined increase in the generator output, whereby said screw shaft is rotated in a direction to cause the friction disc to travel in an opposite direction and to actuate another of said switches for opening said circuits and de-energizing said solenoid, and means for disengaging said clutch from said screw shaft and said gears from each other upon the solenoid being de-energized.

CUYLER W. BROOKS.

REFERENCES CITED

The following references are of record in the file of this patent:

UNITED STATES PATENTS

| Number | Name | Date |
|---|---|---|
| 2,269,434 | Brooks | Jan. 13, 1942 |